United States Patent [19]
Mizoguchi

[11] Patent Number: 5,267,265
[45] Date of Patent: Nov. 30, 1993

[54] DECISION FEEDBACK EQUALIZER WITH EXPANSION AND DECISION CIRCUIT

[75] Inventor: Shoichi Mizoguchi, Tokyo, Japan

[73] Assignee: NEC Corporation, Tokyo, Japan

[21] Appl. No.: 792,795

[22] Filed: Nov. 15, 1991

[30] Foreign Application Priority Data

Nov. 16, 1990 [JP] Japan ................. 2-308827

[51] Int. Cl.[5] ............... H03H 7/30; H03H 7/40
[52] U.S. Cl. ................... 375/14; 364/724.2
[58] Field of Search ............ 375/14, 11, 12, 15; 333/18; 364/724.19, 724.2

[56] References Cited

U.S. PATENT DOCUMENTS

| | | | |
|---|---|---|---|
| 4,524,424 | 6/1985 | White | 375/14 |
| 4,847,797 | 7/1989 | Picchi et al. | 375/15 |
| 5,097,482 | 3/1992 | Serizawa et al. | 375/14 |

OTHER PUBLICATIONS

"An Adaptive Decision Feedback Equalizer", IEEE Transactions On Communication Technology, vol. COM-19, No. 3, Jun. 1971, pp. 281-293 by D. A. George.

*Primary Examiner*—Curtis Kuntz
*Assistant Examiner*—Hai H. Phan
*Attorney, Agent, or Firm*—Laff, Whitesel, Conte & Saret

[57] ABSTRACT

A decision feedback equalizer for equalizing a received analog baseband signal (1) has a gain control circuit (11) which compresses the amplitude of the baseband signal (1) to 1/K (K≧1). The compressed signal is converted to a digital signal by an analog-to-digital converter (12). A decision feedback equalizer section (101) has a feedforward equalizer (201) to which the digital signal is applied, a feedback equalizer (202), and an adder (13) for adding the outputs of the feedforward and feedback equalizers. A postprocessor (15) discriminates the adder output (S1') which has been multiplied by K to thereby output a received data signal (d) and a discrimination error signal (e). An expansive decision circuit (104) expands the adder output by L times (L>1), discriminates the expanded signal, and delivers the result of discrimination to the feedback equalizer (202). A control signal generator (102) feeds tap coefficients to the feedforward and feedback equalizers.

5 Claims, 8 Drawing Sheets

| INPUT RANGE OF S1' | | 1st BIT | 2nd BIT | 3rd~nth BIT |
|---|---|---|---|---|
| D' | ⊗D' | 1 | 1 | 100----0 |
| C' | ⊗C' | 1 | 0 | 100----0 |
| B' | ⊗B' | 0 | 1 | 100----0 |
| A' | ⊗A' | 0 | 0 | 100----0 |

FIG. 6

DECISION FEEDBACK EQUALIZER WITH EXPANSION AND DECISION CIRCUIT

BACKGROUND OF THE INVENTION

The present invention relates to a decision feedback equalizer and, more particularly, to a decision feedback equalizer to be used at a receiving station in a digital radio communication system which used multilevel quadrature amplitude modulation or multiphase phase modulation.

In a modern digital radio communication system, a receiving station uses a transversal equalizer with a transversal filter in order to overcome the degradation of a channel ascribable to frequency-selective fading which occurs on a transmission path. A decision feedback equalizer is even superior to such an equalizer regarding the equalizing characteristic. A decision feedback equalizer is disclosed by D. A. George et al in "An Adaptive Decision Feedback Equalizer", IEEE TRANSACTIONS ON COMMUNICATION TECHNOLOGY, Vol. COM-19, No. 3 June 1971, pp. 281-293.

When deep fading, e.g., two wave fading occurs, the level of a baseband signal being outputted by an demodulator sometimes becomes higher than a predetermined level. Then, the frequency characteristic inside the band noticeably varies and, in the worst case, exceeds the predetermined input range of an analog-to-digital (A/D) converter which follows the demodulator, preventing a received signal from being adequately equalized. To eliminate this problem, i.e., to prevent the A/D converter input from exceeding the predetermined level despite deep fading, it has been customary to interpose between the demodulator and the A/D converter a gain control circuit which compresses the amplitude of the demodulated signal to $1/K$ ($k \geq 1$) and applies the amplitude-compressed signal to the A/D converter. However, such a conventional implementation causes the equalizing ability to lower in the event of two wave fading in which a principal wave and a delayed wave have substantially the same level.

SUMMARY OF THE INVENTION

It is, therefore, an object of the present invention to provide a decision feedback equalizer capable of equalizing a received signal even when an interference wave of substantially the same level as a principal wave is generated.

A decision feedback equalizer for equalizing the output of a demodulator of the present invention comprises a gain control circuit for amplitude-compressing an n-level analog baseband signal fed from the demodulator to $1/K$ ($K \geq 1$) and outputting the amplitude-compressed signal. An A/D converter samples the compressed signal and outputs the sampled signal. A decision feedback transversal filter has a feedforward equalizer, a feedback equalizer, and an adder for adding the outputs of the feedforward and feedback equalizers. The decision feedback transversal filter receives the sampled signal and a signal undergone expansion and decision at the preceding equalizer and succeeding equalizer, respectively, and executes equalization by using tap coefficients to output an equalized digital signal sequence. An expansion and decision circuit expands the equalized digital signal sequence by L times ($L > 1$) and discriminates the expanded signal sequence to produce the signal undergone expansion and decision. A postprocessor expands the equalized digital signal sequence by K times and discriminates the expanded signal sequence to output a data signal including a polarity signal, and an error signal. A control signal generator generates the tap coefficients.

BRIEF DESCRIPTION OF THE DRAWINGS

The above and other objects, features and advantages of the present invention will become more apparent taken in conjunction with the accompanying drawings in which:

FIG. 6 demonstrates the operation of an expansion and decision circuit included in the embodiment;

DESCRIPTION OF THE PREFERRED EMBODIMENTS

Figure 1:
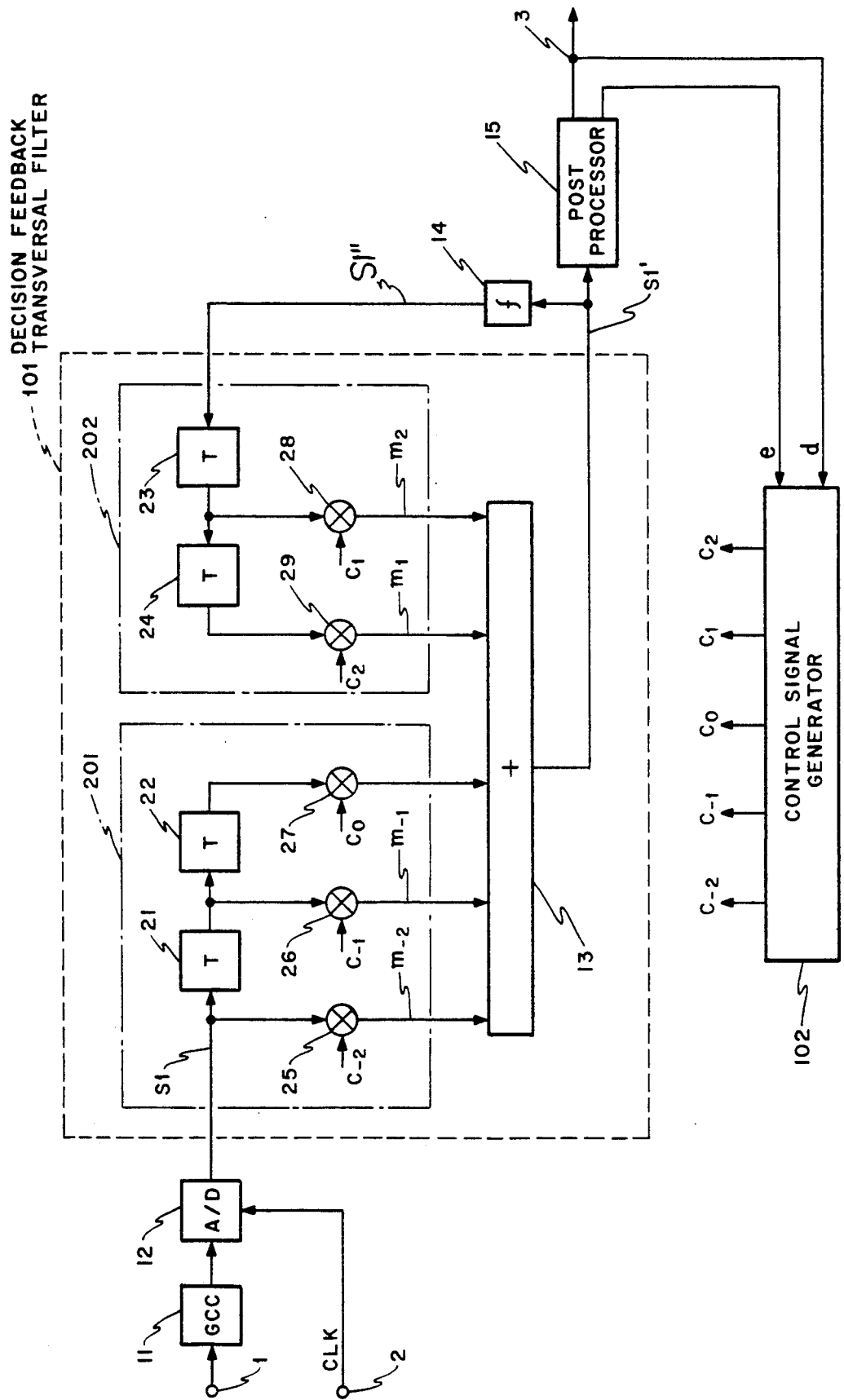
FIG. 1 is a block diagram schematically showing a conventional decision feedback equalizer.

To better understand the present invention, a brief reference will be made to a conventional decision feedback equalizer, shown in FIG. 1. As shown, the conventional decision feedback equalizer has a full digital 5-tap configuration. An analog baseband signal from a demodulator, not shown, is applied to a gain control circuit (GCC) 11 via a data input terminal 1. The output of the GCC 11 is connected to the input of an A/D converter 12 which has a predetermined input range. The GCC 11 compresses the amplitude of the analog baseband signal to $1/K$ ($K \geq 1$) and applies the amplitude-compressed signal to the A/D converter 12, so that the amplitude-compressed signal may not exceed the input range of the A/D converter 12 when waveform distortions occur due to fading on the transmission path.

A clock signal CLK is fed to the A/D converter 12 via a clock input terminal 2. The A/D converter 12 samples the amplitude-compressed signal at a sampling frequency $f_c$ and delivers the sampled signal to a decision feedback transversal filter 101 as an N-bit digital signal sequence S1.

The decision feedback transversal filter 101 has a feedforward equalizer 201 and a feedback equalizer 202. In the feedforward equalizer 201, the digital signal sequence S1 is fed to a first multiplier 25 and a first delay circuit 21. The output of the first delay circuit 21 is connected to a second multiplier 26 and a second delay circuit 22. The output of the second delay circuit 22 is connected to a third multiplier 27. A decision circuit 14 discrimination the output S1' of the transversal filter 101 and delivers the resulting output thereof to the feedback equalizer 202. In the equalizer 202, the output of the decision circuit 14 is applied to a third delay circuit 23 whose output is connected to a fourth multiplier 28 and a fourth delay circuit 24. The output of the fourth delay circuit 24 is connected to a fifth multiplier 29. The delay circuits 21–24 are each implemented by, for example, a D-type flip-flop for delaying the input by $1/f_c$. The multipliers 25–29 multiply respectively their input digital signals by tap coefficients $C_{-2}$, $C_{-1}$, $C_0$, $C_1$ and $C_2$ which are fed thereto from a control signal generator 102. The resulting outputs $m_{-2}$, $m_{-1}$, $m_0$, $m_1$ and $m_2$ of the multipliers 25–29, respectively, are fed to an adder 13.

The adder 13 digitally adds the inputs $m_{-2}$–$m_2$ to thereby remove intersymbol interference included in the original signal S1. The output of the adder 13, i.e., equalized digital signal sequence S1' is delivered to a postprocessor 15 and the decision circuit 14. The decision circuit 14, which will be described in detail later, determines the input signal level (binary number) to be an ideal signal level closet thereto and delivers the result of decision as a decision signal. As a result, the suceeding equalizer 202 consisting of the delay circuits 23 and 24 and multipliers 28 and 29 receives the decision signal which is free from the waveform distortions ascribable to fading or similar cause. Hence, so long as the tap coefficients fed to the multipliers are accurate and the outputs of the multipliers 28 and 29 do not saturate, the intersymbol interference which the suceeding equalizer 202 can remove is fully equalized.

The postprocessor 15 restores the original signal having been compressed to 1/K by the GCC 11 to the original level, i.e., to the level which would be obtainable if the non-amplitude-compressed signal were applied to the decision feedback equalizer. The signal whose level is so corrected by the postprocessor 15 is sent out as an output signal d of the equalizer via an output terminal 3. Further, the postprocessor 15 delivers to the control signal generator 102 a discrimination error signal e representative of a difference between the equalized signal and the ideal value.

The operations of the decision circuit 14 and postprocessor 15 will be described specifically hereinafter.

Assume that the input signal to the data input terminal 1 is the in-phase or orthogonal baseband signal (4-level) undergone 16-level quadrature amplitude modulation (16 QAM). Then, if the 4-level signal were free from intersymbol interference, it would have ideal levels A, B, C and D as indicated by circles in FIG. 2A. The ideal levels A, B, C and D are respectively representative of 2-bit data signals (00), (01), (10) and (11) of the first and second bits. The third bit and successive bits shown in FIG. 2A are representative of deviations from the ideal values, i.e., discrimination error signals.

Assuming that the compression ratio 1/K is ½, then the points A, B, C and D are compressed to points A', B', C' and D' as indicated by dots in FIG. 2A. The ideal values of the points A', B', C' and D' are represented by 3-bit signals (010), (011), (100) and (101), respectively. In this case, the fouth bit and successive bits constitute the discrimination error signal. Since the output signal S1' of the decision feedback transversal filter 101 include thermal noise and intersymbol interference which is unable to be removed, the discrimination error signal varies randomly. Therefore, should the first to N-th bit signals be directly fed back to the feedback equalizer 202, the error included in the input to the equalizer would disturb equalization.

In light of this, it has been customary, as shown in FIG.2B, to cause the decision circuit 14 to determine the first to third bits unconditionally to be any one of the ideal values (010), (011), (100) and (101) and determine the fourth bit and successive bits to be a fixed value (100 ... 0) (" ... " representing all ZEROs). For example, when N is 5, the decision circuit 14 outputs S1''=10010 in response to a signal S1'=10011 or outputs S1''=10110 in response to a signal S1'=11100.

On the other hand, the postprocessor 15 doubles the compressed signal to restore it to the original signal level obtainable if the signal were not compressed, by executing signal conversion as shown in FIG. 2C. As a result, the postprocessor 15 outputs a signal having three bits which are associated with paths 1, 2 and 3, respectively. For example, the postprocessor 15 outputs D=101 in response to a signal S1'=10011 or outputs D=111 in response to a signal S1'=11100. The paths 1 and 2 are the data bits d while the paths 3 is the error bit e showing the polarity of an error signal.

The control signal generator 102 determines the correlation between the polarity signals d (path 1) and the error signals e (path 3) to output the tap coefficients $C_{-2}$–$C_2$ as mean values with respect to time. This kind of principle of tap coefficient generation belongs to a family of conventional adaptive automatic equalization algorithms and taught in, for example, "DIGITAL SIGNAL PROCESSING", The Institute of Electronics and Communication Engineers of Japan, 1975, Chapter 11.

Figure 3:
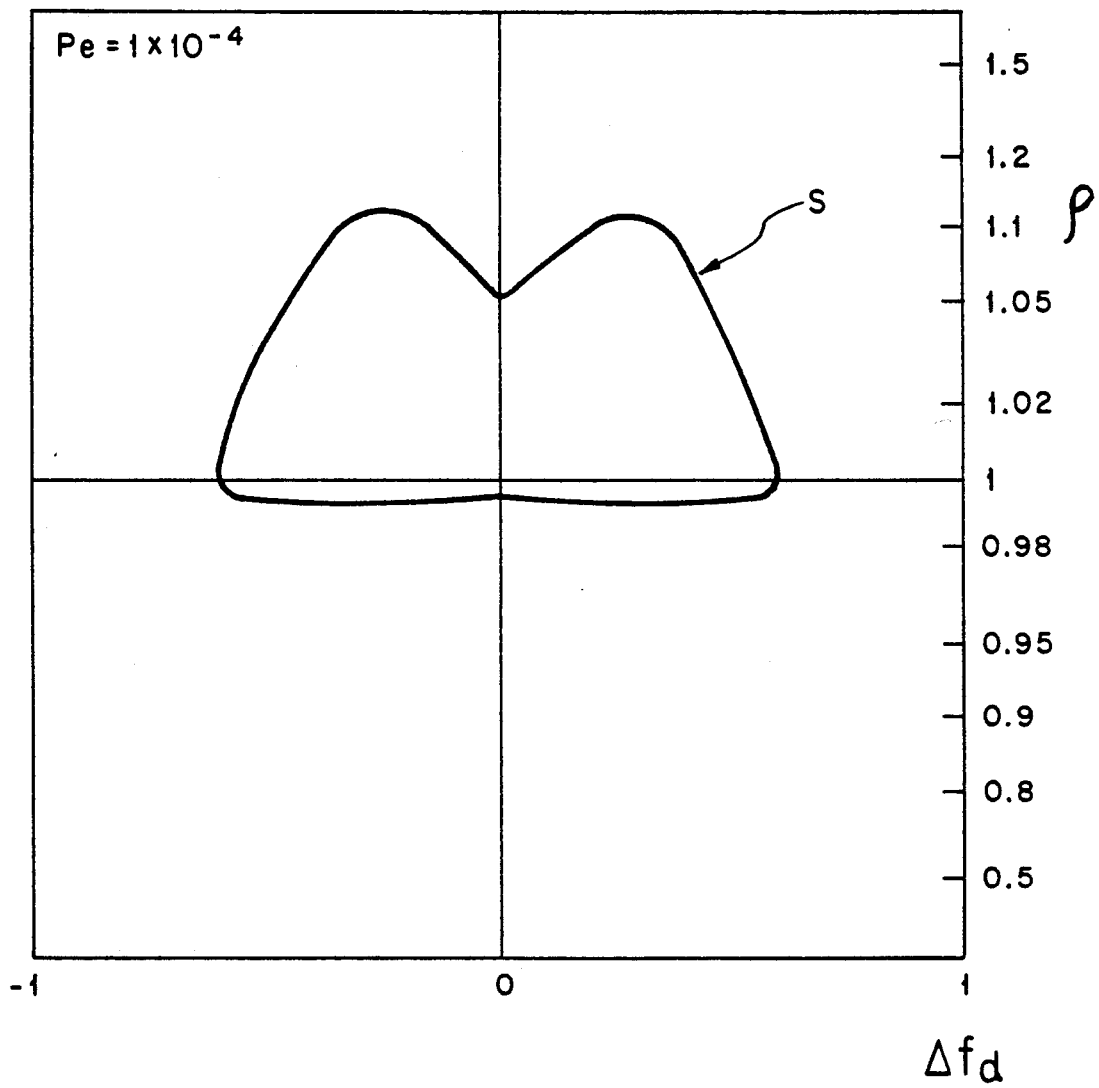
FIG. 3 shows a closed curve representative of the equalizing ability of the conventional equalizer.

FIG. 3 shows a two wave interference fading equalization characteristic particular to the above-described conventional decision feedback equalizer and sometimes called a signature curve. In FIG. 3, the abscissa indicates notch positions $\Delta f_d$ produced by normalizing the deviations of the notch frequencies of fading from the center of the spectrum by a clock frequency; the ordinate indicates amplitude ratios $\rho$ produced by normalizing the amplitudes of reflected waves (delayed waves) by the amplitude of a principal wave. A notch depth Dn is expressed as:

$$Dn = -20 \log (1-\rho) \text{ dB}.$$

Hence, the maximum notch depth is $|\infty|$ when $\rho$ is 1. The closed curve S shown in FIG. 3 connect the points of notch position $\Delta f_d$ and amplitude ratio $\rho$ where the error rate Pe is $1 \times 10^{-4}$, using $\Delta f_d$ and $\rho$ as parameters. Inside the curve S, a relation $Pe > 1 \times 10^{-4}$ holds. This shows that the ability of an equalizer increases with the decrease in the area enclosed by the curve S. In the range of $0 < \rho < 1$, the feedback equalizer 202 removes intersymbol interference since the interference wave is delayed relative to the principal wave; in the range of $\rho > 1$, the feedforward equalizer 201 removes intersymbol interference since the delayed wave is the principal wave. It is to be noted that the specific values shown in FIG. 3 were measured when use was made of 16 QAM, the number of taps was seven, N was 2, and $\tau/T$ was 0.1. Here, $\tau$ and T denote respectively a time lag between the principal and delayed waves and an intersymbol distance $1/f_c$.

As stated earlier, the input signal to the feedback equalizer 202 is the decision signal undergone equalization and, therefore, substantially identical with an ideal value. Therefore, in the range of $0 < \rho < 1$ shown in FIG. 3, the decision feedback equalizer executes substantially perfect equalization. However, when $\rho$ is greater than 1, the equalizing ability is poorer than in the case of $0 < \rho < 1$ since the input to the feedback equalizer 202 still contains intersymbol interference. The conventional decision feedback equalizer cannot equalize the received signal beyond $\rho=1$ since the multiplier output reaches the limit in the vicinity of $\rho=1$.

Figure 4:
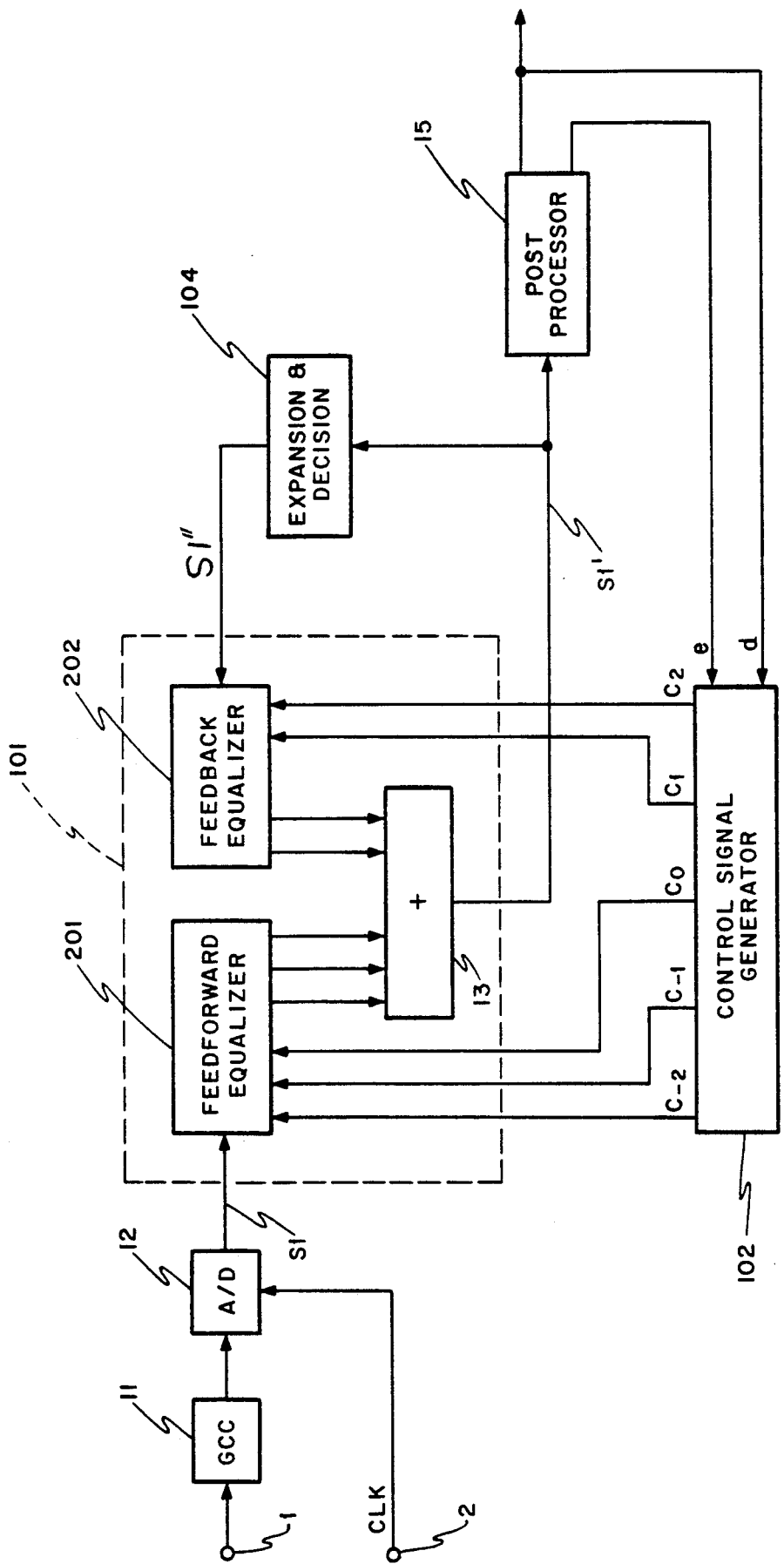
FIG. 4 is a block diagram schematically showing a decision feedback equalizer embodying the present invention.

Referring to FIG. 4, a decision feedback equalizer embodying the present invention is shown which is free from the drawback particular to the conventional equalizer as discussed above. As shown, the embodiment has an expansion and decision circuit 104 in place of the decision circuit 14. For the rest of the construction, the embodiment is similar to the conventional technology shown in FIG. 1. Hence, let the following description concentrate on the expansion and decision circuit 104.

In the conventional decision feedback equalizer, as the amplitude of the delayed (or reflected) wave increases from $\rho=0$, the equalizing ability reaches the limit in the vicinity of $\rho=1$ since the tap coefficients of the succeeding equalizer 202, i.e., the coefficients of the multipliers 28 and 29 become maximum, as described previously. Under this condition, the conventional equalizer applies the decision output of the decision circuit 14 which has been compressed to 1/K to the input of the multipliers. By contrast, in the illustrative embodiment, the expansion and decision circuit 104 expands the amplitude of decision output by L(L>1) times and feeds the resulting expanded decision output to the multipliers 28 and 29 via the delay circuits 23 and 24. As a result, multipliers 28 and 29 each outputs and L times greater product to thereby noticeably enhance the equalizing ability, compared to the conventional decision feedback equalizer.

Figure 5:
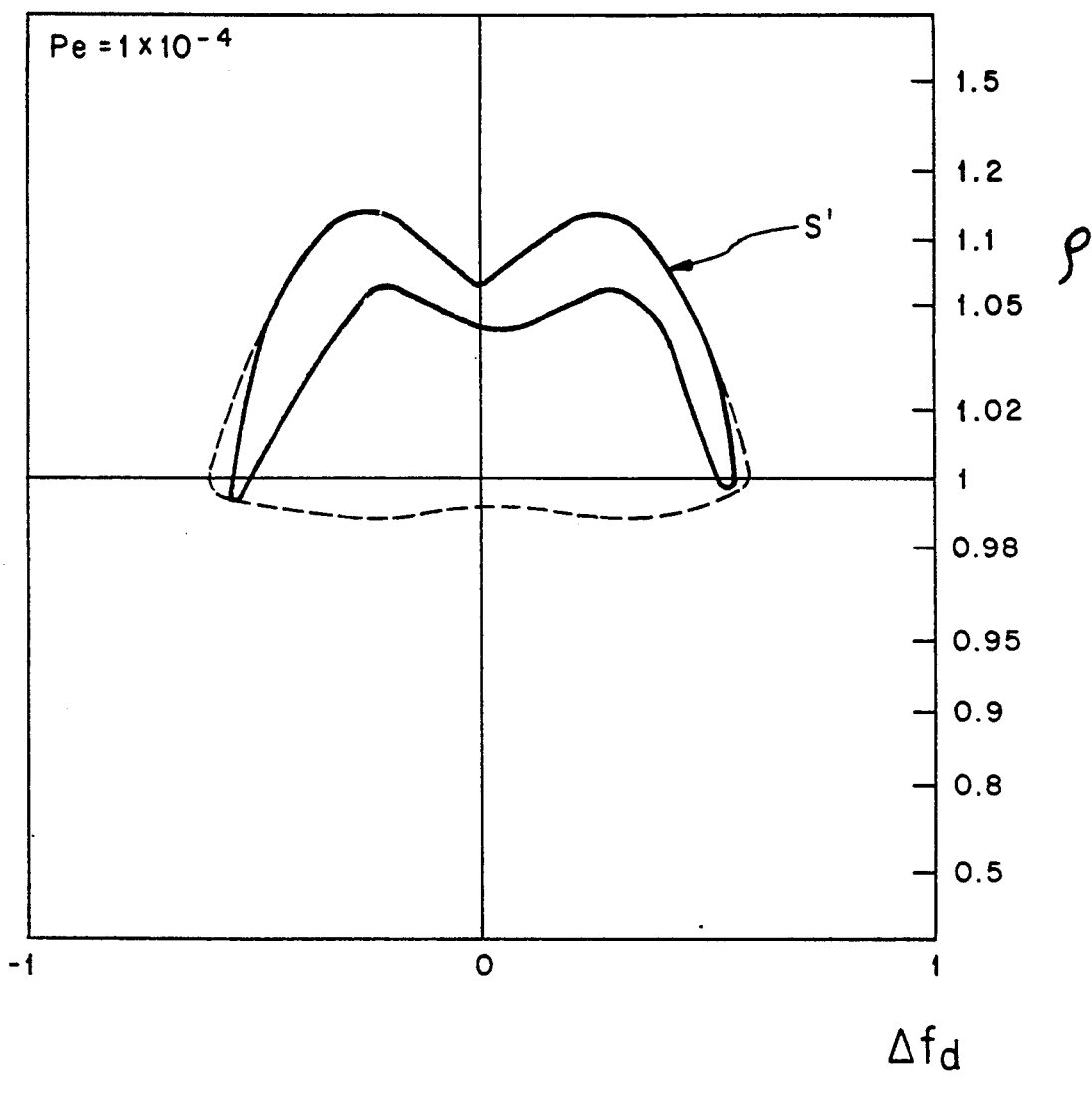
FIG. 5 is representative of an equalizing ability achievable with the embodiment.

FIG. 5 shows an equalization characteristic S' achievable with the embodiment, also assuming the conditions of measurement shown in FIG. 3 except for K=4 and L=8. As the curve S' indicates, the embodiment is capable of equalizing a received signal even with greater amplitude ratios $\rho$ than the conventional decision feedback equalizer (presented by a dotted line).

FIG. 6 indicates the input and output logic of the expansion and decision circuit 104, assuming L=2. As shown, the expansion and decision circuit 104 outputs, for example, (00100 . . . 0) in response to a signal A' or outputs (10100 . . . 0) for a signal C'.

While the foregoing description has concentrated on the input and output logic of the expansion and decision circuit 104 under a condition of K=L=2, the logic will be described in a more generic sense hereinafter in relation to the condition of K=L=2.

Assume that the ideal values of the input to the GCC 11 are $a_1, a_2, \ldots, a_n$ when waveform distortions due to fading and other similar causes do not exist at all. Here, n is the number of levels of an input analog baseband signal and is, for example, 4 when the input analog baseband signal is a 16 QAM in-phase component. Let a relation $a_1 > a_2 > \ldots > a_n$ hold. Specifically in the example shown in FIG. 2A, $a_1$-$a_4$ correspond to A-D, respectively. It will be readily seen that in the distortion-free condition, the ideal values $a_i (i=1, 2, \ldots, n)$ are the input signal S1' to the expansion and decision circuit 104 which has values (1/K) $a_i$.

Assume that the mean value of nearby ideal values (1/K)$a_i$ and (1/K)$a_{i+1}$ of the expansion and decision circuit input signal S1' is $T_i$, i.e., $T_i=(\frac{1}{2}K)\cdot(a_i+a_{i+1})$. The expansion and decision circuit 104 outputs a substantially L/K timers greater value than the ideal value $a_i$ corresponding to the input signal S1' by using $T_i (i=1, 2, \ldots, n-1)$ as a threshold value. At this instant, let S1' smaller than $T_1$ and S1' greater than $T_{n-1}$ be $(L/K)\cdot a_1$ and $(L/K)\cdot a_n$, respectively. The relation between the input signal S1' and the expansion and decision circuit output signal S1" is shown in Table 1 below.

TABLE 1

| INPUT (S1') | OUTPUT (S1") |
|---|---|
| $S1' \leq T_1$ | $\frac{L}{K} a_1$ |
| $T_i < S1' \leq T_{i+1}$ <br> (i = 1, 2, ..., n − 2) | $\frac{L}{K} a_{i+1}$ |
| $S1' > T_{n-1}$ | $\frac{L}{K} a_n$ |

$T_i = \frac{1}{2K} (a_i + a_{i+1})$

It will be understood that when K=L=2, the values shown in Table 1 are coincident those of FIG. 6. It may occur that S1" shown in Table 1 has a numerical value which can not be expressed correctly by the number of operation bits (N) determined by the required operation accuracy of the decision feedback equalizer, depending on the combination of K and L. In such a case, the expansion and decision circuit 104 is caused to output an N-bit digital signal value close to S1" of Table 1.

The expansion and decision circuit 14 can be implemented easily and economically by a ROM (Read Only Memory) or similar memory and a logic circuit including an AND gate and an OR gate. In the range of $1 < L \leq K$, the decision feedback transversal filter section can be implemented by multipliers having the same number of input and output bits as conventional multipliers, eliminating the need for a greater number of coefficient bits or a greater number of output bits.

Generally, when deep fading should be equalized, K has to have a great value since the input level of the A/D converter 12 is restricted by the waveform distortions. The illustrative embodiment allows L to be increased in proportion to K, further enhancing the equalizing ability. Specifically, as K is increased to accommodate greater waveform distortions, L can be increased also and allows much more greater waveform distortions to be equalized. Of course, when use is made of Multiples having a great number of output bits, L greater than K may be selected to further enhance the equalizing ability.

Figure 2:
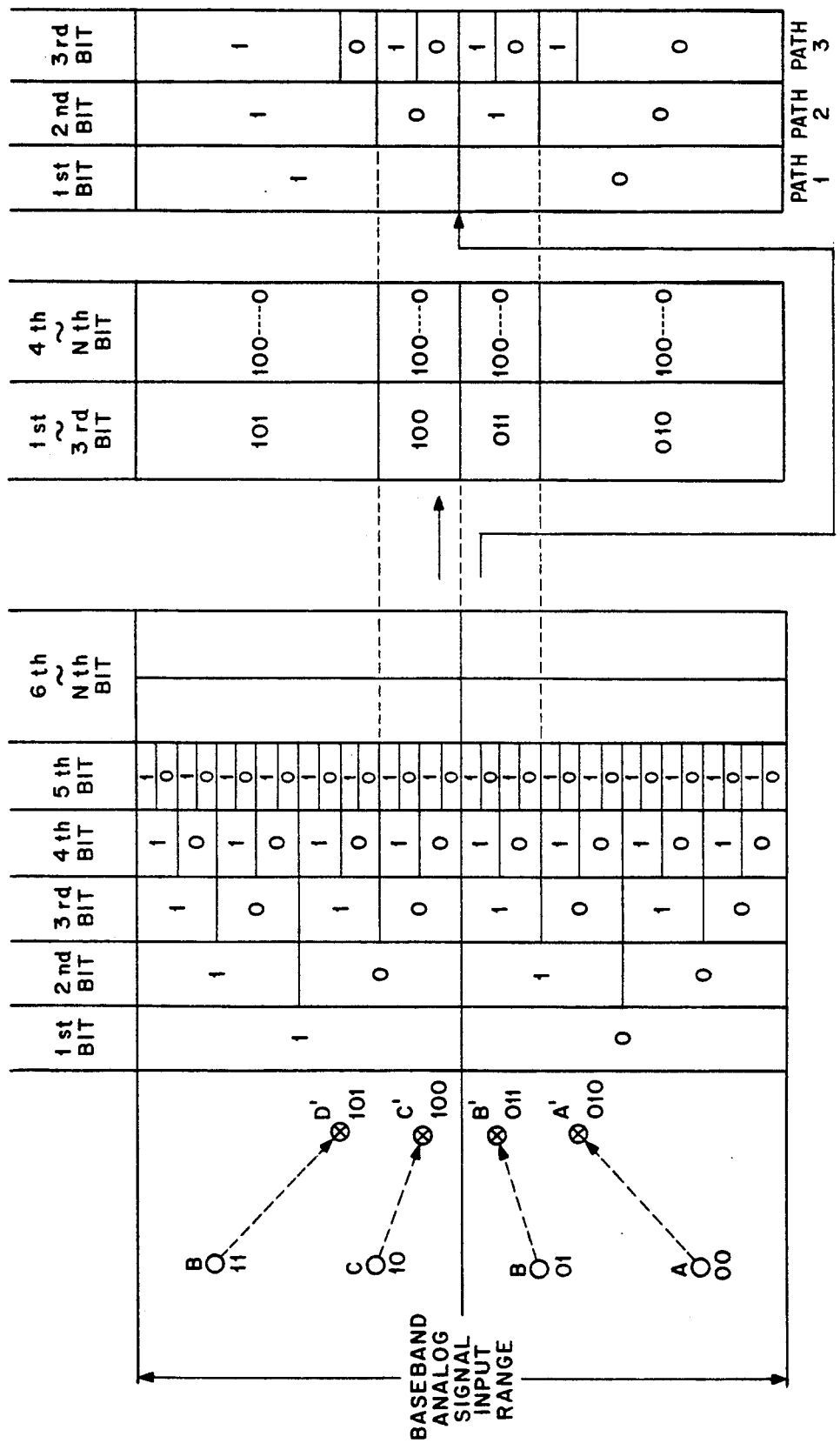
FIGS. 2A-2C demonstrate respectively the operations of a gain control circuit, decision circuit and a postprocessor included in the equalizer of FIG. 1.

When the clock frequency $f_c$ is so high that the delay of the expansion and decision circuit 104 exceeds one bit (one clock period), the succeeding equalizer 202, FIG. 2, may be used if the delay circuit 23 is omitted therefrom.

Figure 7:
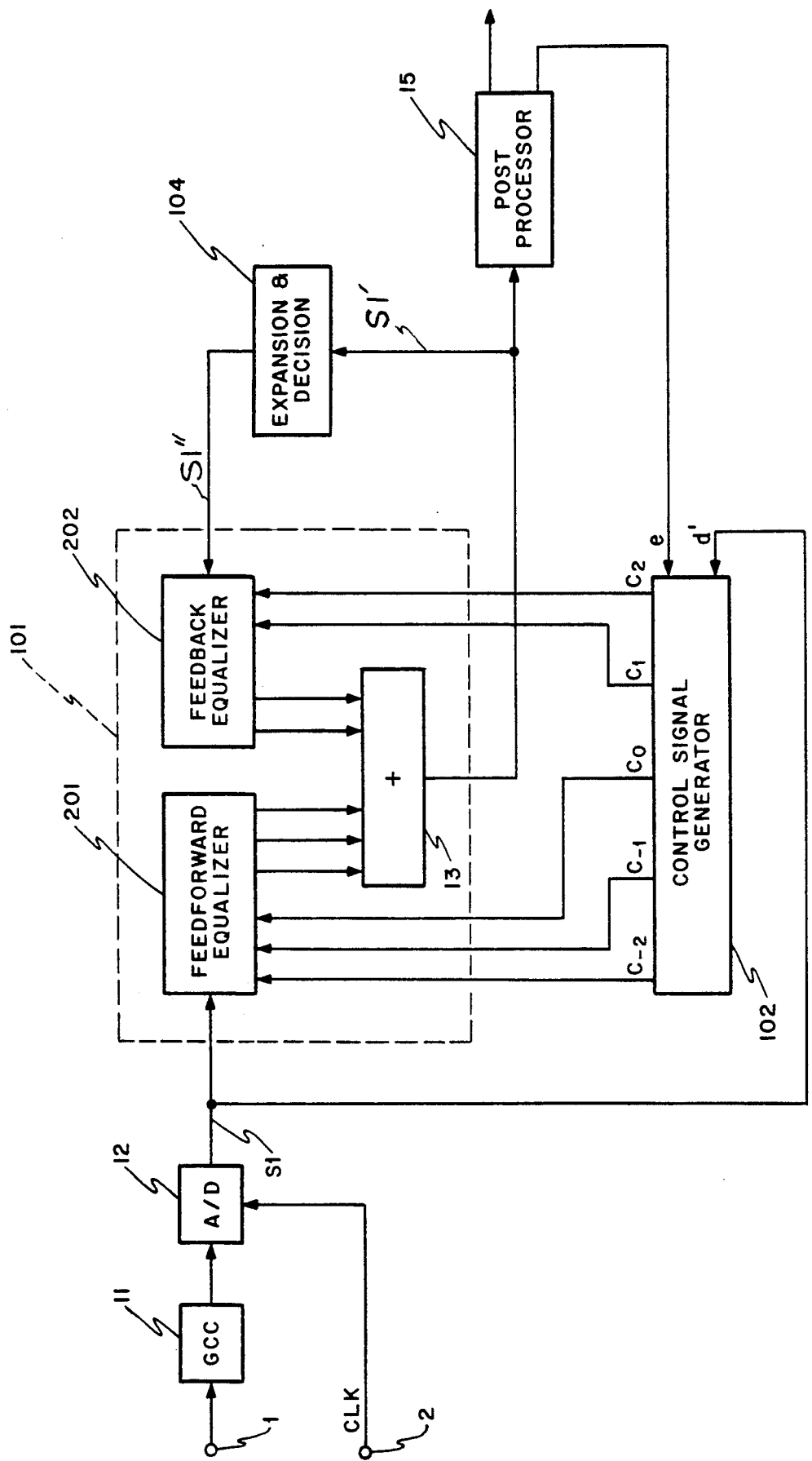
FIG. 7 is a block diagram schematically showing an alternative embodiment of the present invention.
Figure 8:
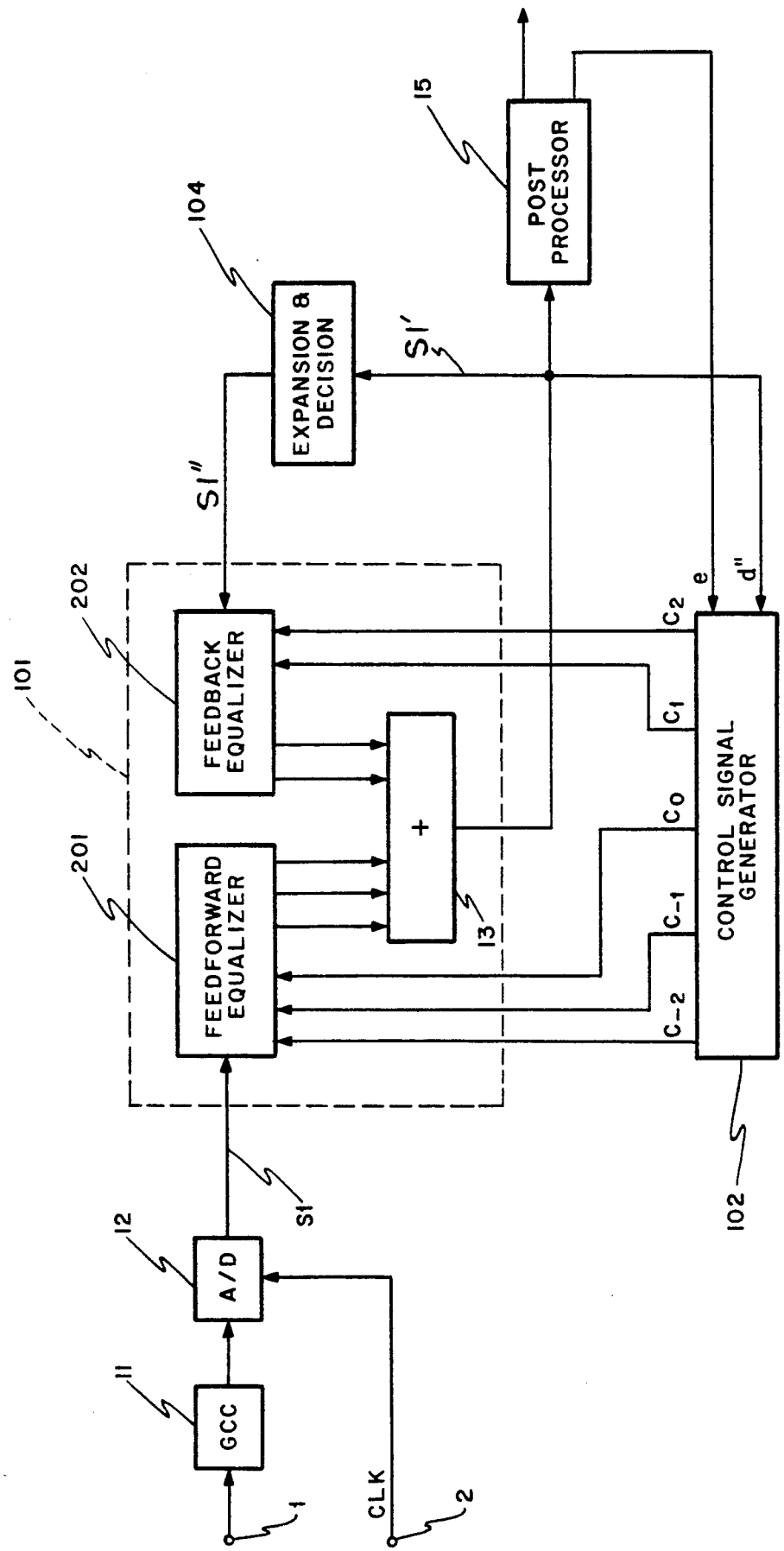
FIG. 8 is a schematic block diagram showing another alternative embodiment of the present invention.

In the embodiment shown in FIG. 4, the control signal generator 102 is supplied the polarity signal (first bit of d) in the output of the postprocessor 15. Alternatively, as shown in FIG. 7, the polarity signal may be replaced with a polarity signal which is the first bit of the feedforward equalizer 201 input (d'). Further, the polarity signal may be replaced with a polarity signal, FIG. 8, which is the first bit of the adder 13 output (d"). If desired, use may be made of a data signal including not only the polarity (first bit) but also the second bit and successive bits.

While the present invention has been shown and described in relation to a unidimensional 5-tap decision feedback equalizer, the present invention is of course practicable with any other desired number of taps. Moreover, the present invention is applicable to an orthogonal 2-dimensional equalizer having four cascaded equalizer sections particular to QAM or multiphase phase modulation.

In summary, it will be seen that the present invention provides a decision feedback equalizer which has a greater equalizing ability than a conventional equalizer of this type. Specifically, an expansion and decision circuit is connected between the output of a decision feedback transversal filter section and the decision feedback input of a feedback equalizer so as to expand the signal level to be fed back.

Various modifications will become possible for those skilled in the art after receiving the teachings of the present disclosure without departing from the scope thereof.

What is claimed is:

1. A decision feedback equalizer for equalizing the output of a demodulator, comprising:
   a gain control circuit for amplitude-compressing an n-level analog baseband signal fed from said demodulator to $1/K$ ($K \geq 1$) and outputting the amplitude-compressed signal;
   an analog-to-digital (A/D) converter for sampling said amplitude-compressed signal and outputting the sampled signal;
   a decision feedback transversal filter comprising a feedforward equalizer, a feedback equalizer, and an adder for adding the outputs of said feedforward equalizer and said feedback equalizer, said decision feedback transversal filter receiving said sampled signal and an expansive decisioned signal at said feedforward equalizer and said feedback equalizer, respectively, and executing equalization by using tap coefficients to output an equalized digital signal sequence ($S1'$);
   expansive decision means for expanding said equalized digital signal sequence by L times ($L > 1$) and determining the L times expanded signal sequence to produce said expansive decisioned signal;
   postprocessing means for expanding said equalized digital signal sequences by K times and determining the K times expanded signal sequence to output a data signal comprising a polarity signal, and an error signal; and
   control signal generating means for generating said tap coefficients in response to said polarity signal and said error signal.

2. A decision feedback equalizer as claimed in claim 1, wherein, assuming that a given level of said n-level analog baseband signal is $a_i$ ($i = 1, 2, \ldots, n$) ($a_1 < a_2 \ldots < a_n$) and that a threshold value $T_i$ is equal to $(\frac{1}{2}K) \cdot (a_i + a_{i+1})$ ($i = 1, 2, \ldots, n-1$), said expansive decision means outputs said expansive decisioned signal a digital value close to $(L/K) \cdot a_1$ when $S1' \leq T_1$, a digital value close to $(L/K) \cdot a_{i+1}$ when $T_i </S1' \leq T_{i+1}$, or a digital value close to $(L/K) \cdot a_n$ when $S1' > T_{n-1}$.

3. A decision feedback equalizer as claimed in claim 1 or 2, wherein said control signal generating means generates said tap coefficients by determining a correlation between said error signal and said data signal as mean values with respect to time.

4. A decision feedback equalizer as claimed in claim 1 or 2, wherein said control signal generating means generates said tap coefficients by determining a correlation between said error signal and said sampled signal as mean values with respect to time.

5. A decision feedback equalizer as claimed in claim 1 or 2, wherein said control signal generating means generates said tap coefficients by determining a correlation between said error signal and said equalized digital signal sequence as mean values with respect to time.

* * * * *